(12) United States Patent
Clark et al.

(10) Patent No.: US 7,841,060 B2
(45) Date of Patent: Nov. 30, 2010

(54) METHOD FOR JOINING COMPONENTS

(75) Inventors: Daniel Clark, Belper (GB); John R Webster, Derby (GB)

(73) Assignee: Rolls-Royce plc, London (GB)

( * ) Notice: Subject to any disclaimer, the term of this patent is extended or adjusted under 35 U.S.C. 154(b) by 483 days.

(21) Appl. No.: 11/580,875

(22) Filed: Oct. 16, 2006

(65) Prior Publication Data

US 2007/0095442 A1 May 3, 2007

(30) Foreign Application Priority Data

Oct. 28, 2005 (GB) ................................. 0521990.2

(51) Int. Cl.
*B23P 11/00* (2006.01)

(52) U.S. Cl. ............................ 29/447; 29/505; 29/509; 148/563; 148/402; 403/274

(58) Field of Classification Search .................. 29/405, 29/407.07, 447, 505, 509, 821, DIG. 46; 148/563, 402; 403/274, 282
See application file for complete search history.

(56) References Cited

U.S. PATENT DOCUMENTS

| | | | | |
|---|---|---|---|---|
| 4,293,942 A | * | 10/1981 | Baumgartner | 368/280 |
| 4,679,292 A | * | 7/1987 | Mead | 29/447 |
| 4,934,743 A | * | 6/1990 | Kapgan et al. | 285/23 |
| 4,980,960 A | * | 1/1991 | Usui et al. | 29/447 |
| 5,058,936 A | * | 10/1991 | Kapgan et al. | 285/382 |
| 5,062,018 A | * | 10/1991 | Yaeger | 360/244.6 |
| 5,120,175 A | * | 6/1992 | Arbegast et al. | 411/501 |
| 5,485,667 A | * | 1/1996 | Kleshinski | 29/447 |
| 5,630,671 A | * | 5/1997 | Larson | 403/28 |
| 5,662,362 A | | 9/1997 | Kapgan | |
| 6,422,797 B2 | * | 7/2002 | Pas | 412/33 |
| 6,637,110 B2 | * | 10/2003 | Jee | 29/890.031 |
| 6,907,652 B1 | * | 6/2005 | Heijnen | 29/447 |
| 2005/0172471 A1 | * | 8/2005 | Vietmeier | 29/447 |
| 2005/0244245 A1 | | 11/2005 | Efremov | |

FOREIGN PATENT DOCUMENTS

JP         59087938 AB         10/1985

* cited by examiner

*Primary Examiner*—Jermie E Cozart
(74) *Attorney, Agent, or Firm*—Jeffrey S. Melcher; Manelli Denison & Selter PLLC

(57) ABSTRACT

A method for joining components comprises locating a region, such as an end region 24, of a shape memory alloy (SMA) material component 10 adjacent to a further component 12, and generating localized plastic deformation of the aforesaid region to create a joint between the components 10, 12. The localized plastic deformation of the shape memory alloy material component 10 is preferably generated by applying a shock load to the shape memory alloy material component 10.

18 Claims, 3 Drawing Sheets and approximately 110° around the curved connection portion.
METHOD FOR JOINING COMPONENTS

FIELD OF THE INVENTION

The present invention relates to a method for joining components, in particular to a method for joining a shape memory alloy material component to a further component.

BACKGROUND OF THE INVENTION

Shape memory alloy ("SMA") actuators are known and can be used in gas turbine engines, for example to control the movement of flaps or other devices in the engine.

One known form of SMA actuator comprises a shape memory alloy material component joined to a further component. The further component is pre-loaded such that when the shape memory alloy material component is in its martensitic phase and, therefore, soft and relatively malleable, the pre-load applied to the further component deforms the shape memory alloy material component to a predetermined position. However, when the shape memory alloy component is in its austenitic phase, it returns to its original shape by overcoming the pre-load applied to the further component.

It can be difficult to join shape memory alloy material components to further components, and it would therefore be desirable to provide an improved method for joining components.

SUMMARY OF THE INVENTION

According to a first aspect of the present invention, there is provided a method for joining components, the method comprising locating a region of a shape memory alloy material component adjacent to a further component, and generating localized plastic deformation of the aforesaid region to create a joint between the components.

The step of generating said localized plastic deformation may be carried out at ambient temperature. The method may comprise generating localized high intensity shear zones in the shape memory alloy material component to generate said localized plastic deformation. The method may comprise generating adiabatic shear bands in the shape memory alloy material component which may generate said localized plastic deformation.

The step of generating said localized plastic deformation may cause intermingling of grains in the shape memory alloy material component with grains in the further component. The intermingling of grains may create the joint between the shape memory alloy material component and the further component.

The method may comprise applying a shock load to the region of the shape memory alloy material component located adjacent to the further component which may generate said localized plastic deformation. The method may comprise repeatedly applying the shock load which may generate said localized plastic deformation.

The step of generating said localized plastic deformation may comprise plastically deforming the aforesaid region of the shape memory alloy material component by bending it around part of the further component, for example by bending it around an end of the further component.

The method may comprise defining a bending region in the shape memory alloy material component which may facilitate bending around the further component, preferably at a predetermined location. The method may comprise defining said bending region prior to bending the shape memory alloy material component around the further component.

The method may comprise providing a curved connection portion on the further component prior to the step of generating said localized plastic deformation. The curved connection portion may comprise a generally spherical connection member. The step of generating said localized plastic deformation may comprise plastically deforming the aforesaid region of the shape memory alloy material component by bending it around the curved connection portion.

The step of plastically deforming the aforesaid region of the shape memory alloy material component may create a curved end on the shape memory alloy material component. The curved end may extend around the curved connection portion. The radius of curvature of the curved end may be between approximately 1 mm and approximately 2 mm.

The step of generating said localized plastic deformation may cause the shape memory alloy material component to bend around the curved connection portion to define an overlap of between approximately 100°

The method may comprise providing a spacing member between the curved connection portion and the shape memory alloy material component prior to generating said localized plastic deformation of the shape memory alloy material component.

The method may comprise providing an anti-galling material between the curved connection portion and the shape memory alloy material component prior to generating said localized plastic deformation which may define a hinged joint between the shape memory alloy material component and the further component after the step of generating said localized plastic deformation.

The step of generating said localized plastic deformation may create a crimped joint between the region of the shape memory alloy material component located adjacent to the further component, and the further component.

The shape memory alloy material component may comprise Nickel—Titanium (NiTi). The further component may comprise Titanium (Ti).

According to a second aspect of the present invention, there is provided a component comprising a shape memory alloy material component joined to a further component using the method according to the first aspect of the present invention.

According to a third aspect of the present invention, there is provided a shape memory alloy actuator for a gas turbine engine, the shape memory alloy actuator including a first actuator component comprising a shape memory alloy material and a second actuator component joined to the first actuator component, wherein the first and second actuator components have been joined using the method according to the first aspect of the present invention.

An embodiment of the present invention will now be described by way of example only, and with reference to the accompanying drawings, in which:

DETAILED DESCRIPTION OF THE INVENTION

Figure 1:
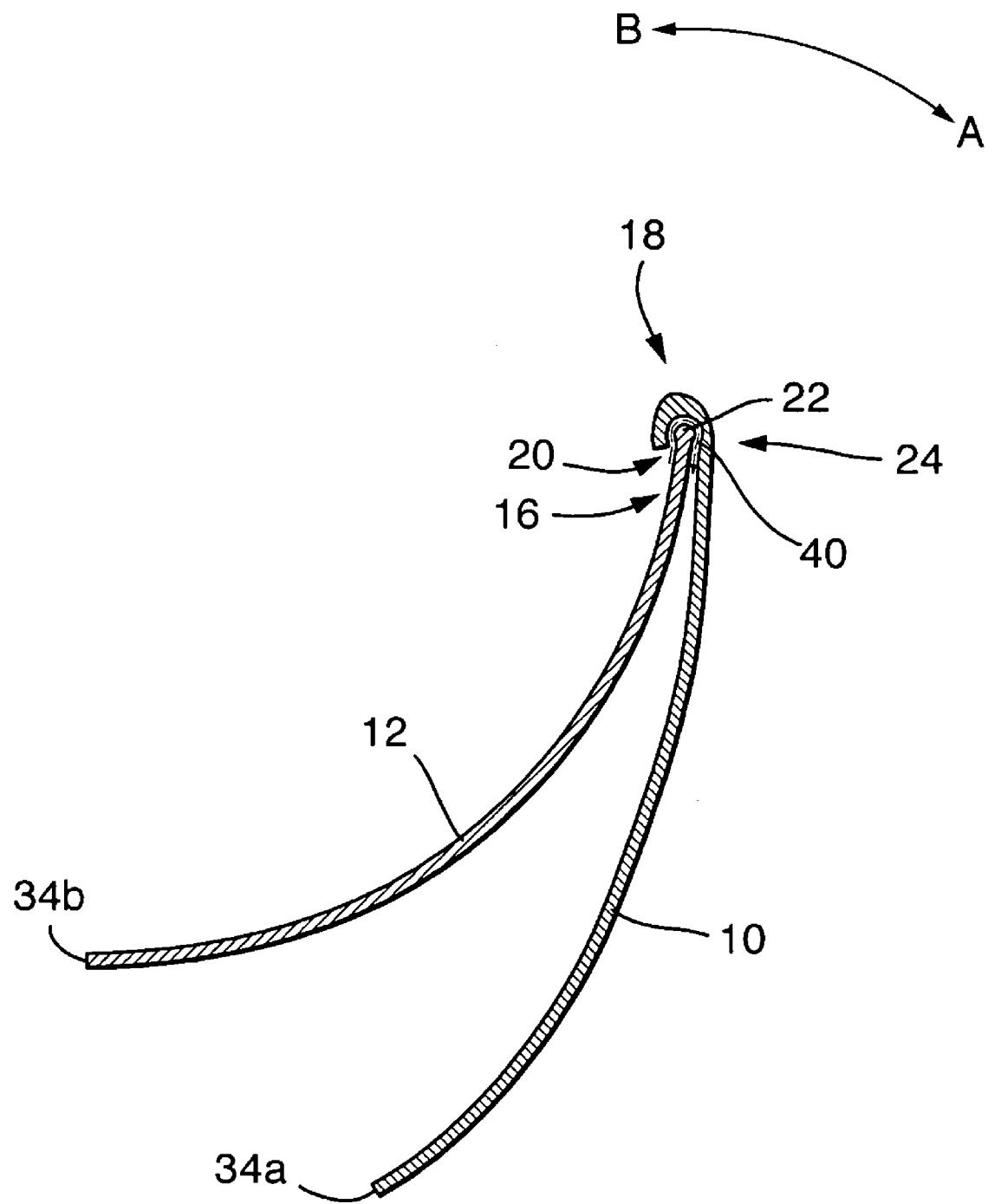
FIG. 1 is a diagrammatic cross-sectional view of a shape memory alloy material component joined to a further component using the method according to the invention.
Figure 2:
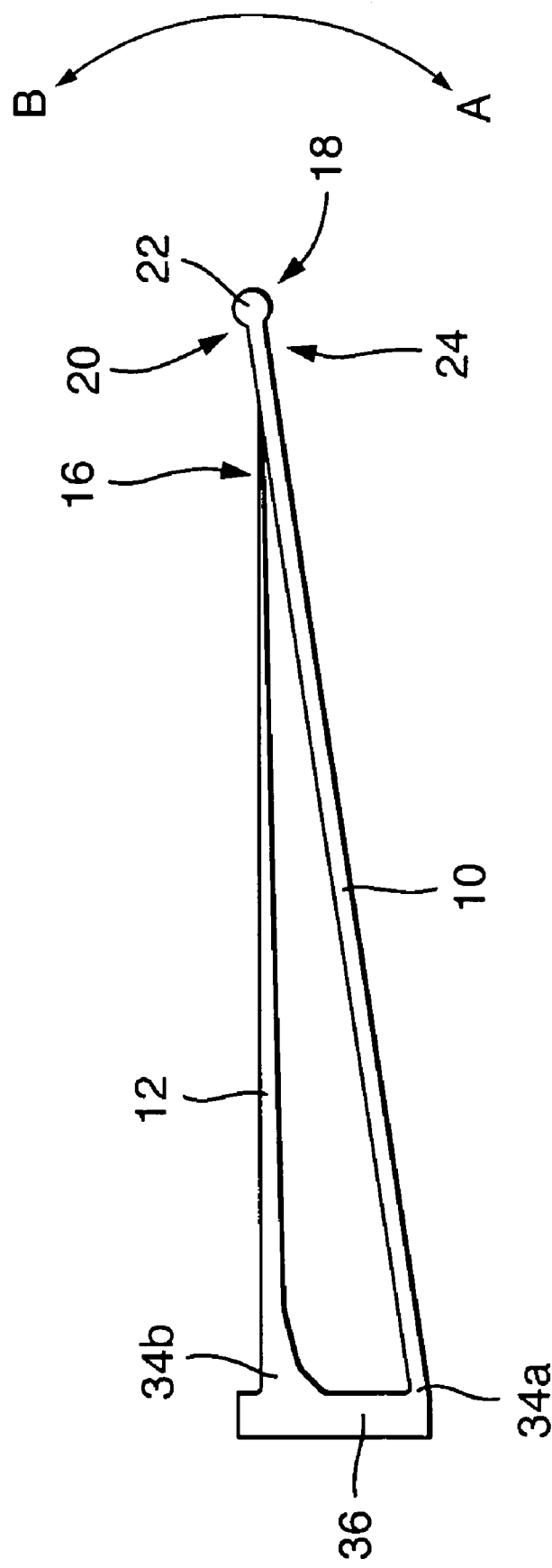
FIG. 2 is a further diagrammatic view of a shape memory alloy material component joined to a further component using the method according to the invention.

Referring to FIGS. 1 and 2, there is shown generally a shape memory alloy ("SMA") material component 10 joined to a further component 12 using the method according to the present invention. In one embodiment of the invention, the SMA material component 10 comprises Nickel-Titanium (Ni—Ti) and the further component 12 comprises Titanium (Ti), such as Titanium 6/4.

The SMA material component 10 is initially deformed or pre-loaded before it is joined to the further component 12. This initial deformation of the SMA material component 10 is carried out by heating the SMA material component 10 so that the material is in the austenitic phase, and by bending the component 10 in the desired direction whilst it is in the austenitic phase. One end of the SMA material component 10 may be clamped whilst the other end is displaced to cause the desired degree of bending.

The step of heating and bending the SMA material component 10 could, for example, be carried out in a hot water bath. Generally, for a Ni—Ti SMA material component 10, it is necessary to heat the component 10 to a temperature above 60° C. so that it is in the austenitic phase.

The further component 12 is also initially pre-loaded before it is joined to the SMA material component 10. Again, this pre-loading may be carried out by clamping one end of the further component 12 and displacing the other end to bend the component 12. Alternatively, the pre-loading of the further component 12 may be achieved by rapidly heating and cooling one of the surfaces of the further component 12.

The SMA material component 10 and the further component 12 are pre-loaded so that the pre-loads are applied in opposing directions. The pre-load applied to the SMA material component 10 will tend to cause movement of the resulting joined component in a first direction, A, when the SMA material component is heated so that it is the austenitic phase, whilst the pre-load applied to the further component 12 will tend to cause movement of the resulting joined component in a second direction, B. This movement occurs about the ends 34a, 34b of the SMA material component 10 and the further component 12 which are immovably anchored. In the embodiment of FIG. 2, a stiffening member 36 is located between the respective ends 34a, 34b.

The SMA material component 10 will be relatively soft when it is in the martensitic phase, and the pre-load applied to the further component 12 will cause movement of the SMA material component 10, and hence the resulting joined component, in direction A. As the temperature to which the resulting joined component is subjected increases such that the SMA material component 10 enters the austenitic phase, the shape memory effect will cause the SMA material component 10 to move in direction B to thereby overcome the pre-load applied to the further component 12 and resume the shape which was initially defined by the SMA material component 10 following application of the pre-load thereto.

In accordance with the present invention, the SMA material component 10 and the further component 12 are joined by locating a region of the SMA material component 10 adjacent to the further component 12, and thereafter generating localized plastic deformation of the aforesaid region of the SMA material component 10 located adjacent to the further component 12.

Figure 3A:
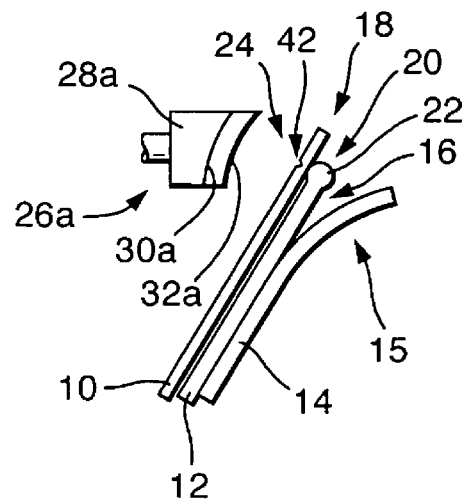
FIGS. 3a to 3c are diagrammatic views of the shape memory alloy material component and the further component of FIG. 1 at different stages of joining.

In more detail, and referring to FIG. 3a, the further component 12 is mounted on suitable support tool, for example comprising a support member 14 defining a generally curved region 15 and having a layer of soft material, such as rubber, on the surface thereof. The further component 12 is mounted on the support member 14 so that an end region 16 of the further component 12 is unsupported, whilst the remainder of the further component 12 contacts the surface of the support member 14 such that it is supported thereby.

The SMA material component 10 is located adjacent to the further component 12 in the manner illustrated in FIG. 3a so that an end 18 of the SMA material component 10 extends beyond a corresponding end 20 of the further component 12.

In one embodiment of the invention, the end 20 of the further component 12 is initially deformed, before the SMA material component 10 and the further component 12 are located adjacent to each other on the support member 14 and before they are joined together, to define a curved connection portion such as a generally spherical connection region 22 on the further component 12. The generally spherical connection region 22 may be formed by a suitable machining process.

Once the SMA material component 10 and the further component 12 have been located adjacent to each other in the manner discussed above on the support member 14, a shock load is applied at ambient temperature to an end region 24 of the SMA material component 10 using a load application means 26a. The load application means 26a is mounted on a suitable force generator, such as an electromagnet or a hydraulic ram, which is capable of generating a force of sufficient magnitude to accelerate the load application means 26a at high speed in a direction towards the end region 24 of the SMA material component 10 to impact it at high speed and thereby apply the shock load.

The load application means 26a comprises a mounting member 28a, for example formed of steel, which has a curved impact surface 30a for impacting the end region 24 of the SMA material component 10. The curvature of the surface 30a ensures that the shock load is applied to the end region 24 of the SMA material component 10 in a predetermined direction to cause the end 18 of the SMA material component 10 to bend in a desired direction, around the generally spherical connection region 22 of the further component 12.

In order to prevent the shock load applied by the load application means 26a from damaging the end region 24 of the SMA material component 10, a cushioning member 32a, for example comprising a rubber material, is mounted on the curved impact surface 30a. This also ensures that the shock load is evenly applied to the end region 24 of the SMA material component 10. If desired, the load application means 26a could apply the shock load to the end region 24 of the SMA material component 10 through a substantially incompressible fluid, such as water. This would ensure an even more uniform application of the shock load to the end region 24 of the SMA material component 10.

Figure 3B:
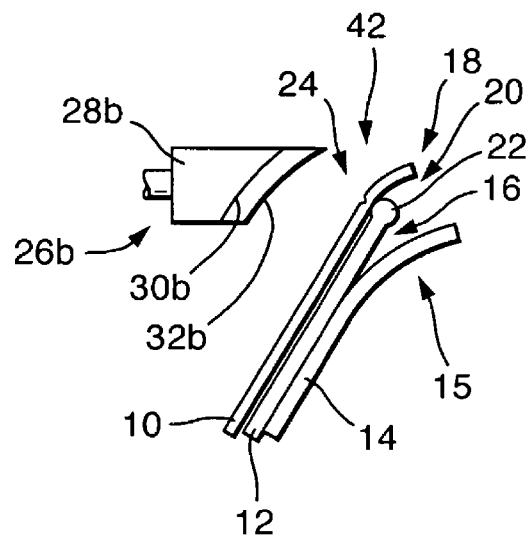

Referring to FIGS. 3a to 3b, in one embodiment of the invention, the SMA material component 10 is provided with a bending region 42 near to the end region 24 before the shock load is applied to the SMA material component 10. The bending region 42 facilitates bending of the SMA material component 10 at a predetermined location when the shock load is applied.

The bending region 42 comprises a weakened region and is provided by creating a reduction in the thickness of the SMA material component 10. The bending region 42 may comprise a groove, or similar stress concentrating feature, defined in a surface of the SMA material component 10. For an SMA material component 10 with a thickness in the order of 1 mm, where a groove is provided it may have a depth of approximately 10 to 20 μm.

The bending region 42 may be created by any suitable method. For example, where the bending region 42 is in the form of a groove, it may be created by a point grinding method or by an electrochemical machining method. It is important that the method employed does not significantly elevate the temperature of the SMA material component 10 so that its material properties are not affected.

The application of a shock load to the SMA material component 10, using the load application means 26a, generates localized plastic deformation in the end region 24 of the SMA material component 10 thereby causing it to plastically deform by bending around the generally spherical connection region 22 of the further component 12. Where a bending region 42 has been provided, bending will generally take place about this region.

The application of the shock load to the end region 24 of the SMA material component 10 at ambient temperature causes adiabatic heating of the SMA material component 10 due to the high strain rates which occur as a result of the shock loading. The adiabatic heating generates localized zones of high intensity shear stress resulting in the creation of adiabatic shear bands within the SMA material component 10, and hence the generation of said localized plastic deformation.

Figure 3C:
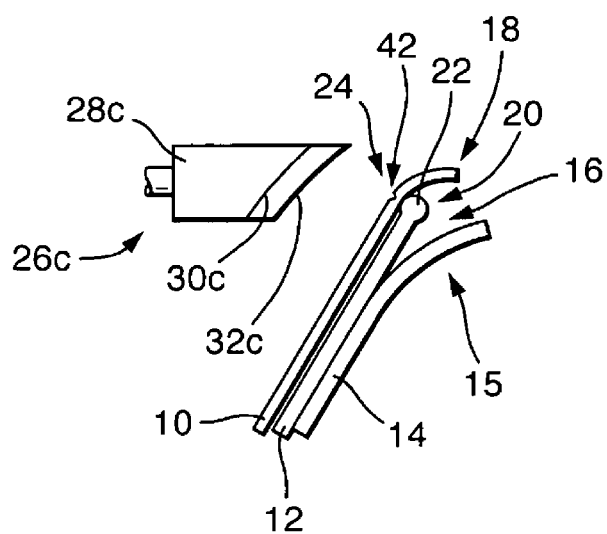

In order to bend the end 18 of the SMA material component 10 around the generally spherical connection region 22 to define a generally curved end 18 extending around the generally spherical connection region 22, it is necessary to repeatedly apply a shock load to the end region 24 of the SMA material component 10, as illustrated in FIGS. 3b, and 3c. After the application of an initial shock load, as illustrated in FIG. 3a, it may be necessary to reposition the further component 12 and the SMA material component 10 on the support member 14 so that their respective end regions 16, 24 are located adjacent the curved region 15 of the support member 14 such that they are unsupported.

In addition to repositioning the SMA material component 10 and the further component 12, it is also desirable to replace the load application means 26a with a similar load application means 26b. The load application means 26b differs from the load application means 26a only in that the curved impact surface 30b has a greater curvature than the curved impact surface 30a. This ensures that the shock load applied by the load application means 26b to the end region 24 of the SMA material component 10 is in a slightly different predetermined direction to the predetermined direction in which the shock load is applied by the load application means 26a. This is necessary to ensure that the end 18 of the SMA material component 10 is bent further in the desired direction around the generally spherical connection region 22 of the further component 12.

A further load application means 26c, as illustrated in FIG. 3c, is used to apply a third shock load to the end region 24 of the SMA material component 10 to bend it further around the generally spherical connection region 22 of the further component 12. Although the end 18 of the SMA material component 10 is shown in FIGS. 3a to 3c to have been substantially bent around the generally spherical connection region 22 of the further component 12 after the application of three successive shock loads using the load application means 26a to 26c, the application of more or less successive shock loads may be necessary in practice to achieve the desired degree of bending so that the SMA material component 10 and the further component 12 are joined, as shown in FIGS. 1 and 2.

As the end 18 of the SMA material component 10 is bent, as a result of localized plastic deformation of the SMA material caused by the application of successive shock loads, to the position shown in FIGS. 1 and 2 in which it curves around the generally spherical connection region 22 of the further component 12, the plastic deformation caused by the application of the shock loads causes microstructural intermingling of grains in the SMA material component 10 with grains in the further component 12, thereby creating a fixed joint between the two components 10, 12 which prevents relative movement therebetween.

The joint is in the form of a crimped joint which provides a functional mechanical interlock between the SMA material component 10 and the further component 12. The resulting joint thus ensures that the respective ends 18, 20 of the SMA material component 10 and the further component 12 are tightly secured together when the SMA material component 10 is in the martensitic phase and the austenitic phase.

Due to the fact the there is microstructural intermingling of the grains but not intermingling of the grains on an atomic level, the chemical properties of the SMA material component 10 and the further component 12 in the region of the joint are unaffected. The method according to the invention does not therefore result in an increased likelihood of failure of the SMA material component 10 or the further component 12 due to undesirable chemical properties.

In one embodiment of the invention, after a sufficient number of successive individual shock loads have been applied to the end region 24 of the SMA material component 10 to bend the end 18 around the generally spherical connection region 22 on the further component 12, the radius of curvature of the curved end 18 is generally between approximately 1 mm and approximately 2 mm, and the curved end 18 of the SMA material component 10 overlaps the generally spherical connection region 22 by approximately 100° to approximately 110°.

In order to ensure accurate and uniform spacing between the respective ends 18, 20 of the SMA material component 10 and the further component 12, a spacing member 40, such as a stiff, low strength compressible interlayer, may be located between the ends 18, 20 of the components before the shock loads are applied. A suitably formed thin polyurethane foam material could be employed as the spacing member 40. The spacing member 40 is shown in broken lines in FIG. 1 to illustrate that it is an optional feature.

In some circumstances, it may be desirable to create a hinged joint, as opposed to a fixed joint as described above, between the SMA material component 10 and the further component 12 to permit some relative movement therebetween. This may improve the mechanical efficiency of the resulting joined component, depending upon the intended application of the joined component. In such situations, an anti-galling (low friction) material in the form of an interlayer could be located between the respective ends 18, 20 of the SMA material component 10 and the further component 12 before the shock loads are applied to the SMA material component 10 to deform the end 18 thereof.

The resulting component formed by joining the SMA material component 10 and the further component 12 in the manner described above may be used as a shape memory alloy actuator in a gas turbine engine. It will however be appreciated by those skilled in the art that the resulting joined component may be used in a variety of other applications.

Although embodiments of the invention have been described in the preceding paragraphs with reference to various examples, it should be appreciated the various modifications to the examples given may be made without departing from the scope of the present invention, as claimed. For example, the SMA material component 10 may comprise a material other than Nickel-Titanium and the further component may comprise a material other than Titanium. The SMA material component 10 and the further component 12 may have geometries other than those illustrated in the accompanying drawings.

Any suitable load application means 26 or any suitable force generator may be employed to apply shock loads to the SMA material component 10 to cause localized plastic deformation thereof. For example, the shock loads could be generated by depositing a volatile material on the end 18 of the SMA material component 10, immersing the SMA material component 10 in a substantially incompressible fluid, such as water, and causing volatisation of the deposited material, for example by directing a laser beam towards the deposited material. Volatisation of the deposited material would create a shockwave which would be confined due to the incompressibility of the surrounding fluid. This would result in localized plastic deformation of the end 18 of the SMA material component 10 in the manner described above.

We claim:

1. A method for joining components, the method comprising:
    locating an end region of a shape memory alloy material component adjacent to a further component;
    generating localised plastic deformation of said end region of the shape memory alloy material component to create a joint between the components, wherein the localised plastic deformation is generated by applying a shock load in a direction toward said end region of the shape memory alloy material component located adjacent to the further component at ambient temperature; and
    generating localised high intensity shear zones or adiabatic shear bands in the shape memory alloy material component to generate said localised plastic deformation.

2. A method according to claim 1, wherein the step of generating said localised plastic deformation causes intermingling of grains in the shape memory alloy material component with grains in the further component to create a joint between the shape memory alloy material component and the further component.

3. A method according to claim 1, wherein the method comprises repeatedly applying the shock load to generate said localised plastic deformation.

4. A method according to claim 1, wherein the step of generating said localised plastic deformation comprises plastically deforming the aforesaid region of the shape memory alloy material component by bending the aforesaid region of the shape memory alloy material component around part of the further component.

5. A method according to claim 4, wherein the method comprises defining a bending region in the shape memory alloy material component to facilitate bending around the further component.

6. A method according to claim 5, wherein the method comprises defining said bending region prior to bending the shape memory alloy material component around the further component.

7. A method according to claim 1, wherein the method comprises providing a curved connection portion on the further component prior to the step of generating said localised plastic deformation.

8. A method according to claim 7, wherein the curved connection portion comprises a generally spherical connection member.

9. A method according to claim 7, wherein the step of generating said localised plastic deformation causes the shape memory alloy material component to bend around the curved connection portion to define an overlap of between approximately 100° and approximately 110° around the curved connection portion.

10. A method according to claim 1, wherein the step of generating said localised plastic deformation comprises plastically deforming the aforesaid region of the shape memory alloy material component by bending the aforesaid region of the shape memory alloy material component around a curved connection portion.

11. A method according to claim 10, wherein the step of plastically deforming the aforesaid region of the shape memory alloy material component creates a curved end on the shape memory alloy material component extending around the curved connection portion.

12. A method according to claim 11, wherein the radius of curvature of the curved end is between approximately 1 mm and approximately 2 mm.

13. A method according to any claim 1, wherein the step of generating said localised plastic deformation creates a crimped joint between the region of the shape memory alloy material component located adjacent to the further component, and the further component.

14. A method according to claim 1, wherein the shape memory alloy material component comprises Nickel—Titanium (NiTi).

15. A method according to claim 1, wherein the further component comprises Titanium (Ti).

16. A method for joining components, the method comprising:
    locating a region of a shape memory alloy material component adjacent to a further component; and
    generating localised plastic deformation of the aforesaid region of the shape memory alloy material component to create a joint between the components, wherein the method comprises providing a curved connection portion on the further component prior to the step of generating said localised plastic deformation and providing a spacing member between the curved connection portion and the shape memory alloy material component prior to generating said localised plastic deformation of the shape memory alloy material component.

17. A method for joining components, the method comprising:
    locating a region of a shape memory alloy material component adjacent to a further component; and
    generating localised plastic deformation of the aforesaid region of the shape memory alloy material component to create a joint between the components, wherein the method comprises providing a curved connection portion on the further component prior to the step of generating said localised plastic deformation and providing an anti-galling material between the curved connection portion and the shape memory alloy material component prior to generating said localised plastic deformation to define a hinged joint between the shape memory alloy material component and the further component after the step of generating said localised plastic deformation.

18. A method for forming an actuator for a gas turbine engine, the actuator including a first actuator component and a second actuator component, the method comprising:
    locating a region of said first actuator component comprising a shape memory alloy adjacent to said second actuator component; and
    generating localised plastic deformation of said shape memory alloy region of said first actuator component to create a joint between said first actuator component and said second actuator component, wherein the localised plastic deformation is generated by applying a shock load to the region of shape memory alloy of the first actuator component located adjacent to the second actuator component at ambient temperature.

* * * * *